United States Patent [19]

Speaker et al.

[11] 4,003,461
[45] Jan. 18, 1977

[54] ROTARY LOADING APPARATUS

[75] Inventors: Richard L. Speaker; David W. Wolbrink, both of Hartford, Wis.

[73] Assignee: Speaker Motion Systems, Inc., Germantown, Wis.

[22] Filed: Apr. 15, 1974

[21] Appl. No.: 460,950

[52] U.S. Cl. .............................. 198/597; 198/792; 198/803; 214/1 BB; 214/1 BC; 214/151; 272/37

[51] Int. Cl.² ........................................ B65G 21/12

[58] Field of Search .............. 214/1 B, 1 BD, 1 BC, 214/151, 1 BB; 198/25, 110, 209; 272/37, 38, 30, 50; 74/86

[56] References Cited

UNITED STATES PATENTS

| | | | |
|---|---|---|---|
| 1,139,070 | 5/1915 | Phelps | 198/209 X |
| 1,263,485 | 4/1918 | Thornburg | 198/209 X |
| 2,626,702 | 1/1953 | Basus | 198/209 |
| 3,306,426 | 2/1967 | Arnold et al. | 198/209 X |
| 3,422,966 | 1/1969 | Iansons | 214/1 BC |
| 3,603,583 | 9/1971 | Bartlett | 272/37 X |
| 3,743,077 | 7/1973 | Hammitt | 198/110 |

FOREIGN PATENTS OR APPLICATIONS

689,237   3/1953   United Kingdom .............. 198/209

*Primary Examiner*—Frank E. Werner
*Attorney, Agent, or Firm*—Andrus, Sceales, Starke & Sawall

[57] ABSTRACT

An induction rotary loader is mounted between a loader and a sorter for loading of articles onto the sorter, the loader may be tilted with respect to the horizontal preferably a tilting discharge tray unit. Several loading arms are connected for independent pivotal movement about a loader arm pivot unit. A spider plate is provided with a fixed rotating axis radially offset with respect to the pivot unit and includes individual coupling trunnion units which are equicircumferentially spaced and connected one each to the loading arms. As the spider rotates at a constant speed, the couplings carry the arms about their fixed axis with a varying drive position which correspondingly varies the effective length of the pivot radii for the arms with a corresponding variation in the speed of the outer end. Load supports are pivotally mounted on each arm with a support wheel riding on an outer track having a dip to automatically pivot each structure. The load moves into abutment with a forward wall prior to reaching the unloading station. A reciprocating belt of each unit is movable radially of the loader. The belt is secured at the opposite ends and passes over fixed and moving rollers permitting radial movement to drop from the belt to the sorter. A cam unit at the loading and unloading station automatically engages, or a pneumatic operator is operated, to move the moving rollers and belt. A front wall is secured to a fixed front roller and pivoted therewith between a stop position and an unloading position.

32 Claims, 12 Drawing Figures

ROTARY LOADING APPARATUS

BACKGROUND OF THE INVENTION

This invention relates to a rotary loading apparatus and is particularly directed to such an apparatus having means rotating past a receiving station at one speed or velocity for receiving a load, rotating to another station and transferring the article to a receiving means while rotating at a second different velocity.

In the development of automatic material and article handling, high speed conveying and sorting mechanisms have been developed to transfer loads between various stations which may be broadly identified as a loading station and unloading stations.

The particular transfer or sorting mechanism might receive articles from a plurality of sources and discharge them at any one or more of a plurality of different unloading stations under the control of a suitable interlocking memory unit. A particularly satisfactorily sorter mechanism with automatic unloading means is disclosed in U.S. Pat. No. 3,034,665 which employs a double tilting tray for each load which is selectively tilted to one side or the other to discharge the load at a correspondingly located receiving station. A highly improved tilting tray system is disclosed in the copending application entitled CONVEYING APPARATUS INCLUDING TILTING SUPPORT STRUCTURES of Richard L. Speaker et al, filed Apr. 10, 1972 and bearing Ser. No. 242,330 and assigned to the same assignee as this application. This unit employs a pair of tray halves individually and separately pivotally mounted to form a V-shaped support with the appropriate side released to discharge the article.

In all such high speed sorting or conveying mechanisms various efforts have been made to increase the speed of travel to more rapidly process the article. However, the speed of the sorting or conveying mechanism must of course be interrelated to and is constrained by the ability to properly load and unload the conveying mechanism. Various high speed loading devices have been disclosed. For example, U.S. Pat. No. 3,140,771 discloses a high speed induction means having a special transfer element at the terminal end for rapidly moving of the load onto a conveyor such as the tilting tray sorter discussed above. Although such induction units have been satisfactorily employed, there is a need for an induction loading device which will receive a load at a relatively slow speed to permit the necessary encoding of the sorter mechanism and then rapidly transfer the load onto the high speed sorter mechanism. It is desirable to place the load directly onto the central portion of the sorter tray or other load support to provide optimum loading. This is particularly desirable in connection with the V-shaped tray support unit which defines a natural central location means for the load structure.

Summary of the Present Invention

The present invention is particularly directed to a rotary loader having a variable speed for the load supporting means as it moves between circumferentially spaced loading and unloading stations of the rotary loader. Generally in accordance with the present invention, the rotary loader includes a carrier secured to a rotating loader arm means, which rotates about a selected axis. An eccentric drive means is coupled to maintain the carrier on the arm at a selected radius while varying the relative velocity relative to the fixed rotating axis and thereby providing a predetermined variation in the velocity of the carrier. The drive system provides a means to effectively vary the radius of the arm with respect to the fixed drive axis between the loading and the unloading stations. More particularly in accordance with a preferred construction of the present invention, one or more loading arms are connected for independent pivotal movement about a loader arm pivot unit. A drive for the arms is rotatably mounted in offset relationship and coupled through a reciprocating coupling to each of the arms to allow the simultaneous driving of the arms along various positions and thereby producing a changing effective rotating center for the arms between a maximum and a minimum effective radius.

In a particularly practical construction, the several arms are individually pivoted on a relatively fixed axis. A spider type unit is provided with a fixed rotating axis radially offset with respect to the fixed loading arm pivot. The spider includes individual coupling arms extending outwardly and connected one each to the loading arms by suitable sliding couplings. Thus, as the spider rotates at a constant speed, the couplings carry the arms about their fixed axis with a varying drive position on the arms. This, in turn, varies the effective length of the pivot axis or radii for the arms with a corresponding variation in the speed of the outer end.

In accordance with another important feature of the present invention, the load supporting means carried by the arms is pivotally mounted thereto to permit location of the load in an optimum position for discharge. Thus, the supporting means can be pivotally mounted on the outermost end of the arm with a suitable support element riding on an outer track to maintain a normal horizontal transfer position. Between the loading and unloading station, a dip in the track provides an automatic pivoting of the structure to move the load into abutting engagement with a forward wall thereby properly locating of the load for optimum discharge.

The article is transferred from the loading element through any suitable means. In accordance with a particularly significant and novel feature of the present invention, the support structure includes a reciprocating surface such as a belt memory which is movable radially of the rotary loader. This provides for automatic propelling of the load member to the outer periphery of the load and automatic dropping of the load from the rotary loader onto the sorting device. The belt structure can be conveniently secured at the opposite ends on a suitable roller type mechanism permitting the movement of the opposite end to reciprocate the supporting belt radially. A fluid operator may be employed with a valve means momentarily operated at the unloading station. Alternatively cam drive means may be provided at the stations, with one part on the tray structure and the opposite part at the station. At the unloading station, the belt moves rapidly forward and carries the load to the outer periphery for discharge to and from the outer periphery of the supporting means.

Applicant has found that the present rotary loader permits a very reliable and safe transfer of loads at high speeds and thus is particularly adapted to high speed sorting devices such as the previously referred to tilting tray sorters.

BRIEF DESCRIPTION OF DRAWINGS

The drawings furnished herewith illustrate preferred constructions of the present invention in which the above advantages and features are clearly disclosed as well as others which will be readily understood from the following description of the illustrated embodiment.

In the drawings:

FIG. 9 is a view taken generally on line 9—9 of FIG. 4;

DESCRIPTION OF THE ILLUSTRATED EMBODIMENT

Figure 1:
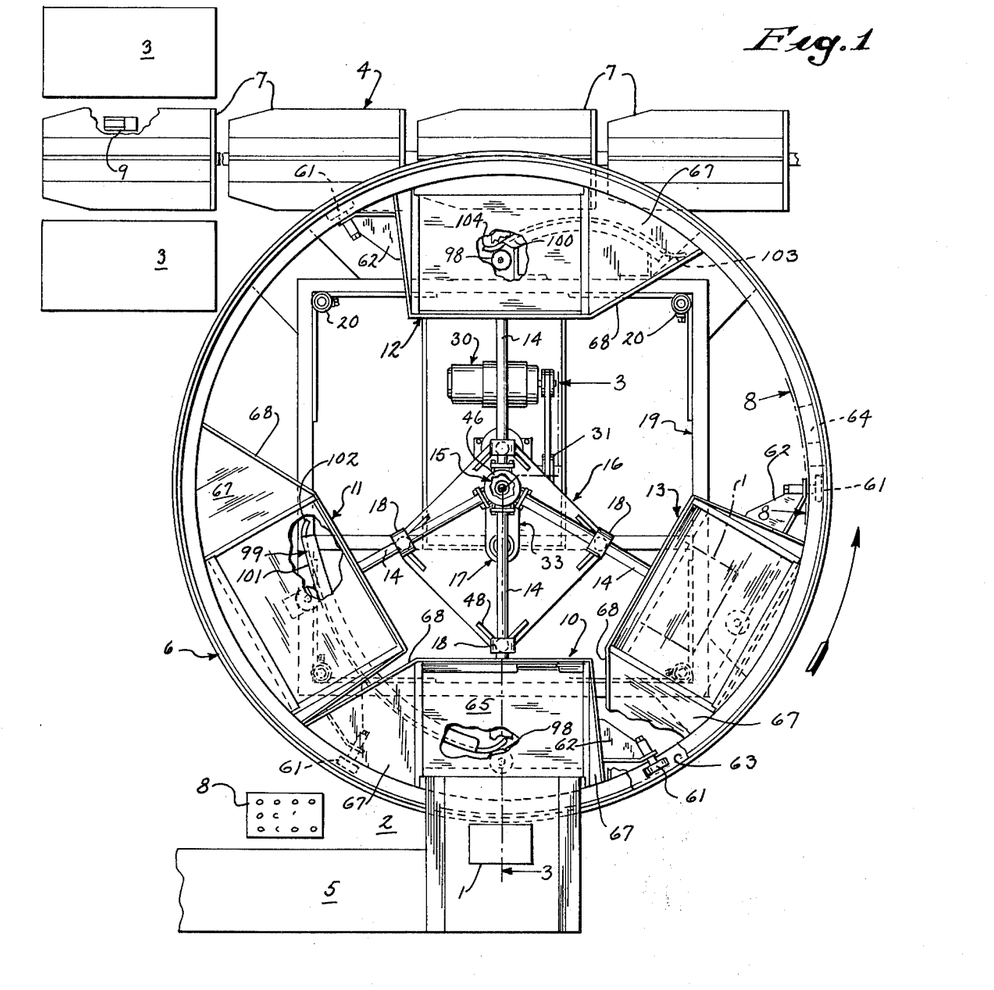
FIG. 1 is a plan diagrammatic view of a load sorting system incorporating a rotary loader constructed in accordance with the present invention.

Referring to the drawings and particularly to FIG. 1, the present invention is shown applied to a means for transferring of loads such as individual packages or articles 1 from a loading station 2 to one or more receiving stations 3 located in spaced relation thereto by a conveying sorter 4. The articles 1 are received in random order on a suitable incoming conveying unit 5. A rotary induction loader 6 which is particularly the subject matter of this invention is provided for transfer of the incoming loads 1 from the incoming conveying unit 5 to the sorter 4. The incoming conveying unit 5 may be any suitable mechanism which will provide feeding of the articles 1 in proper sequence. Similarly, the sorter 4 may be of any suitable conveying means which is adapted to coded control for selective discharge to a selected one of the unloading stations 3 for sorting of the articles into related groups. In accordance with a practical application of the present invention, the sorter 4 preferably includes a series of double tilting tray units 7 such as disclosed in the previously referred to co-pending application of Applicants. Thus, the illustrated sorting device is shown as a unit including a plurality of split tray units 7, each of which is adapted to receive an article 1, or where the load is longer than any one tray unit, it may be carried by two of the tray units. Each tray unit includes a latch unit not shown which, when released, allows the corresponding tray half to drop and discharge the load 1. A memory unit 8 is provided at the loading station 2 with a manual input keyboard for manual introduction of coded information into a memory control, not shown, which operates in timed relation to the operation of the rotary loader 6 and sorter 4 to automatically set a trip unit 9 and tilt the loaded tray unit 7 when aligned with an appropriate receiving station 3, for example, as shown in the previously referred to application of Richard L. Speaker et al, Ser. No. 242,330.

Generally, the rotary loader 6 includes a plurality of load supporting or transfer units which, in the illustrated embodiment of the invention, includes four separate units 10, 11, 12 and 13 which are circumferentially distributed about the loader and rotatably driven between the incoming conveyor 5 and the sorter 4. The articles 1 are introduced onto a transfer unit 10–13 at the incoming conveyor 5, and discharged or transferred to the sorter 4 at a diametrically opposite location of the rotary loader 6. In the illustrated embodiment of the invention of FIGS. 1–3, sorter 4 and particularly tray units 7 pass beneath the periphery of the loader 6 and the articles 1 are discharged by dropping onto the center of the appropriate tray structure 7.

The individual transfer assemblies or units 10–13 are similarly constructed and a single one of the units and its interconnecting support will be described in detail with the corresponding elements of the other units identified with corresponding primed numbers and described so as to clearly set forth the function of each unit.

Generally, the illustrated rotary loader 6 includes an individual pivotally mounted loader arm 14 for each of the tray units 10–13. The loader arms 14 are individually pivoted on a fixed pivot unit 15 for rotation of the tray units 10–13 about a predetermined constant radius or path. A spider drive unit 16 is rotatably mounted as at 17 with an axis offset from the fixed pivot axis and connected through suitable sliding coupling units 18 to each of the arms. The spider drive unit 16 is positively driven and through the coupling units 18 rotates arms 14 about the fixed pivot axis of pivot unit 15. The eccentric mounting of the spider unit 16, however, generates a variable pitch line for the individual arms 14 resulting in a corresponding variation in the relative angular spacing of the arms and associated units 10–13, as shown in FIG. 1 and, more important, a distinct variation in the velocity of the outer ends of the arms and therefore of the units 10–13 as they move past the loading and unloading stations. Thus, it is desired generally to load the units 10–13 at a relatively low speed and to unload at a relatively high speed to accommodate the high speed operation of sorter 4. This is accomplished in the present invention by essentially providing a large or long effective rotating drive radius when aligned with the loading station 2 and establishing a relatively short effective drive radius as the unit 10–13 passes sorter 4.

Figure 2:
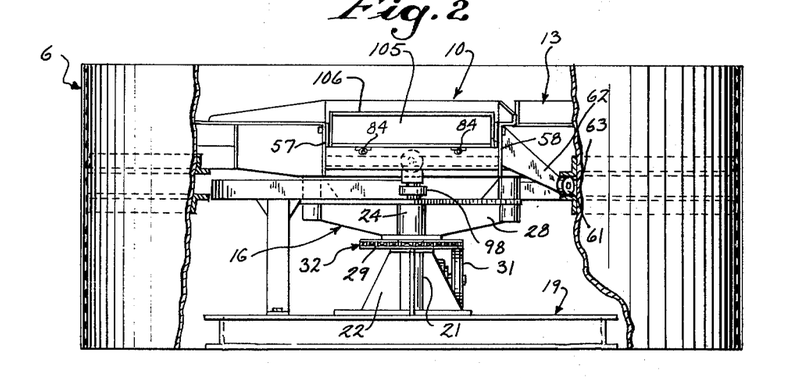
FIG. 2 is a side elevational view of FIG. 1 with parts broken away and in section to more clearly illustrate the details of construction.
Figure 3:
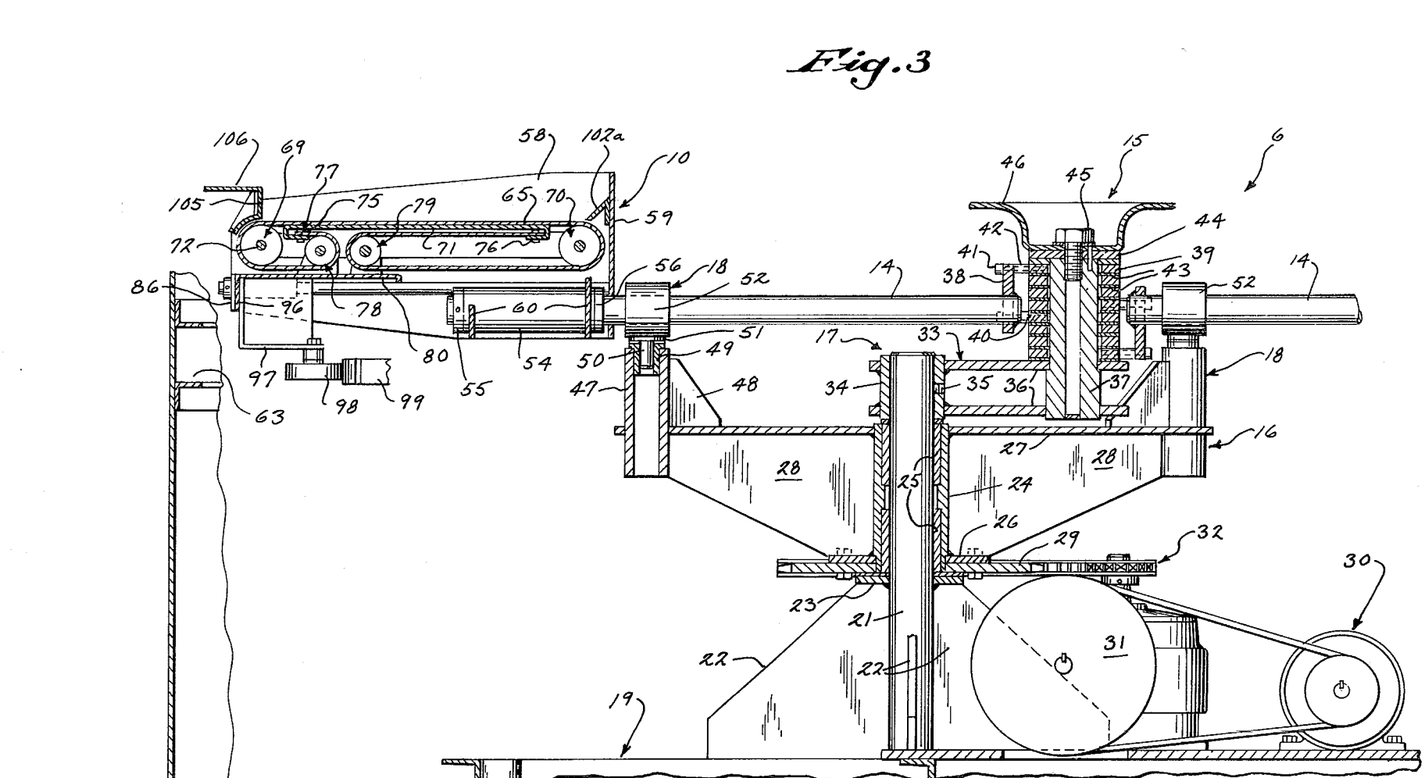
FIG. 3 is an enlarged vertical section taken generally on line 3—3 of FIG. 1.

More particularly, as shown most clearly in FIGS. 2 and 3, the rotary loader 6 includes a supporting base 19 formed of a suitable channel structure or framework, which may include vertically adjustable positioning legs 20 for vertically positioning of the rotary loader 6 with respect to the induction loading conveyor 5 and the sorter 4. A centrally located support shaft 21 is mounted within the framework 19 with a plurality of strengthening plate braces 22. A horizontal bearing support plate 23 is secured to the upper ends of the braces 22 and to the shaft 21 and provides a rotating support for spider structure or unit 16, as follows.

The spider unit 16 includes a supporting tube 24 which telescopes over the base support shaft 21 and is provided with suitable sleeve bearings 25 at the opposite end. A lower drive gear support plate 26 and a coupling plate 27 are secured to the opposite ends of the tube 24 with four equicircumferentially spaced and radially extended strengthening plates or brackets 28 welded therebetween to strengthen the assembly. A gear 29 is bolted or otherwise secured to the underside of the gear plate 26 and rests upon a thrust bearing surface on the support plate 23 or base 19.

The drive mechanism includes a suitable drive motor 30 driving a pulley and speed reducer 31, the output of which is connected through a roller chain 32 or the like to the gear 29. The spider unit 16 rotates about the supporting tube 21 at a constant velocity or speed.

The spider unit 16 further includes equicircumferential arm coupling units 18 providing a separate but interrelated drive to each of the arms 14 about the fixed pivot unit 15, as follows, with reference to FIGS. 1 and 3.

A crank member 33 includes a supporting hub 34 telescoped over the uppermost end of the base shaft 21 and extends upwardly from the spider tube 24 with a thrust bearing element therebetween. The crank hub 34 is fixed to the shaft 21 by any suitable means such as a locking screw 35. The crank 33 is formed as a pair of vertically spaced crank arms 36 which project outwardly from the support hub 34. An arm supporting shaft 37 is welded or otherwise secured to the outer ends of crank arms 36 and defines a fixed pivot location of unit 15 for the loader arms 14, which are each similarly mounted upon the pivot shaft 37.

Thus, for unit 10, the loader arm 14 is a round shaft member having a support plate-like bracket 38 welded to the innermost end.

A pair of annular support bearings 39 and 40 are bolted or otherwise secured in vertically spaced relation to the upper and lower ends of the bracket 38. The bearings 39 and 40 are shown secured to the plate 38 by suitable attachment bolts or locking screws 41 which pass through the plate and thread into the bearings, with suitable spacers 42 provided to space the bearing from the end of the shaft. The axes of the annular support bearings 39 and 40 are located precisely at 90° to the axis or center line of the arm 14.

The bearings 39 and 40 telescope over the supporting shaft 37, with the bearings for the several arms 14 of units 10–13 being interleaved to locate all of the arms in co-planar relationship. Suitable thrust bearings disc members 43 are located between the adjacent support bearings for the several arms 14 rotatably support the arms for rotation not only about the axis but also relative to each other.

A top cap 44 is secured to the upper end of the shaft 37 as by an attachment bolt 45 which threads downwardly into the top portion of the shaft. The cap 44 securely locks the several arms on the outer end of the crank 33 in the illustrated stacked relation. A top cover 46, shown as a sheet metal member, may be clamped in place by the mounting bolt to overlie the inner ends of the arms and the adjacent spider mechanism.

The arms 14 are rotatably mounted centrally of the rotary loader 6 for rotation between the loading and unloading station. The spider unit 16 is located off-center and is provided with the individual coupling units 18 to the arms to rotate the arms simultaneously with the spider.

Each of the outer coupling units 18 includes a coupling tube member 47 welded to one corner of the spider plate 27. Additional strengthening plates 48 are secured to the upper surface of the plate and the outer periphery of the tube to further strengthen the coupling support. A threaded bunting 49 having a bearing flange is secured within the tube member 47. A similarly flanged coupling shaft 50 is supported within the bunting 49 with suitable shims 51 provided to properly locate a trunnion bearing 52 which is slidably disposed on the loader shaft of arm 14. The trunnion 52 slides on the arm 14 such that, as the spider unit 16 rotates, the arm 14 is carried about its fixed axis. The circumferential spacing of the loader arms 14 vary to accommodate the variation in the relative angular orientation with respect to the fixed axis. By placing the loading and unloading stations on diametrically opposite sides of the loader 6, the loading operation is provided at maximum drive radius between the coupling unit and arm axis and therefore with a minimum outer circumferential velocity, while unloading is provided at a minimum radius and at a maximum circumferential velocity, as most clearly shown in FIGS. 1 and 3. The trunnion bearings and concentric position of the spider unit varies the velocity of the outer ends of the arms 14 between a maximum rate in the unloading position and a minimum rate at the position of loading by changing the relative angles of the arms. Thus, the coupling units 18 are maintained in fixed angular relationship, with a pair of the support units 10 and 12 in diametrically opposed relation; the units 11 and 13 are slightly spaced to the opposite side of unit 10 as the spider axis is located toward the unit 10 from the fixed pivot unit 15. Thus, the coupling units 18 for support units 11 and 13 are similarly located. As the spider plate 16 rotates 90 degrees, the railing unit 11 moves through a relatively small angle to the loading position previously occupied by unit 10. The previously loaded unit 13 simultaneously rotates through a much larger angle, and is, thus, rapidly accelerated to a maximum velocity at the unloading position. The several support assemblies 10–13 continuously move with the constant radius but at a varying velocity and in the illustrated system, with a minimum velocity at the loading position and a maximum velocity at the unloading position.

The support assemblies 10–13 are further especially constructed in the illustrated embodiment of the invention for optimum receiving and discharging of the articles 1 as follows.

Referring particularly to FIG. 3, the tray assembly 10 includes a support tube 54 rotatably journalled on the outer end of the corresponding arm 14 between a pair of collar members 55 and 56. The assembly 10 is locked to prevent radial movement along the arm 14 while permitting rotation about the arm axis. The supporting tube 54 is connected to a basic framework of the tray structure which may be formed of a suitable sheet metal, moled plastic or the like to define a generally encircling confining wall member including a pair of side walls 57 and 58 generally parallel to arm 14 and an inner back wall 59 normal to arm 14, as most clearly shown in FIGS. 3 and 5. The supporting tube member 54 is mounted within a pair of axially spaced cross braces 60 secured between the lower portion of sidewalls 57 and 58 and adjacent to the back wall 59. The unit 10 is supported in a horizontal transport position by a support wheel 61 rotatably mounted by a bracket 62 on the leading sidewall 57. The wheel 61 rides on a track 63 which is suitably mounted as a part of the loader framework. As most clearly shown in FIGS. 1 and 8, the track 63 is formed with a dip 64 such that as the wheel 61 moves therethrough, the unit 10 pivots about the arm 14 and moves the article 1 to the leading side of the assembly 10, as hereinafter described.

The upper ends of the vertical sidewalls 57 and 58 are especially shaped above the level of a work support belt 65 to define circumferentially extended article support surface. The leading sidewall 57, as most clearly shown in FIG. 5, includes a horizontal wall extending horizontally outwardly and integrally formed with a vertical wall portion which extends vertically upwardly and then upwardly and inwardly to define a leading recess or pocket 66. The pocket portion is further tapered inwardly to the back wall 59 with a maximum pocket opening adjacent to the entrance end of the assembly 10. The opposite or trailing sidewall 58 is formed as an extended horizontal wall 67 in the form of a V-shaped segment, with the apex adjacent the back wall 59 and with the trailing upper edge wall 68 extending radially angularly outwardly to enlarge the supporting surface of the tray unit 10. The surface 67 is generally in the plane of the belt 65 to define a continuous supporting surface.

The belt 65 is a relatively flat, flexible elongated member of a width equal to the spacing of sidewalls 57 and 58 and is mounted to extend between the front and rear ends of the tray unit 10 between wall 67 and pocket 66. The belt 65 is mounted on a suitable roller system to permit movement radially of the unloader 6, as follows.

Figure 4:
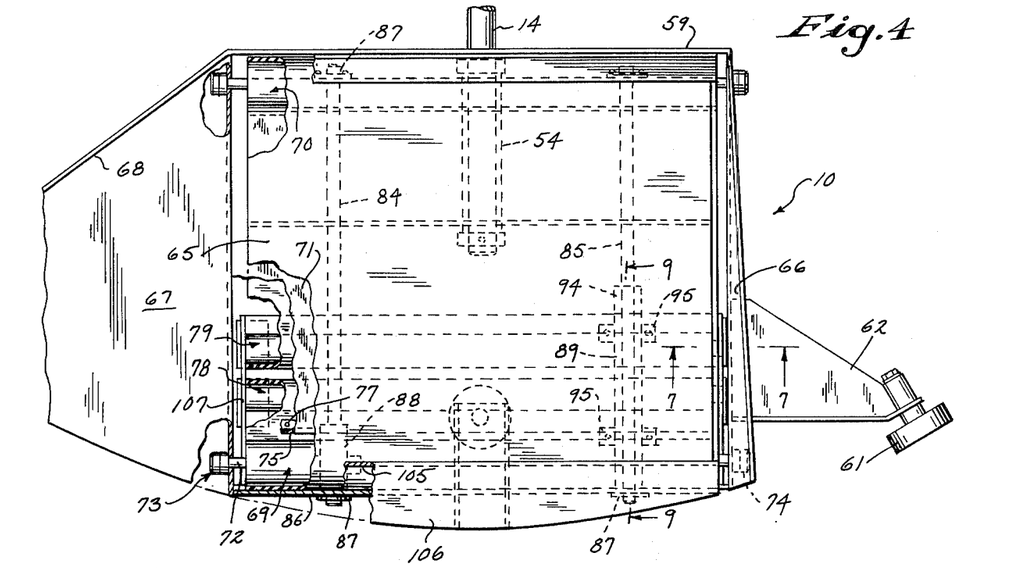
FIG. 4 is an enlarged plan view of a load carrying structure shown in FIGS. 1—3.
Figures 5, 6, 7, 8:
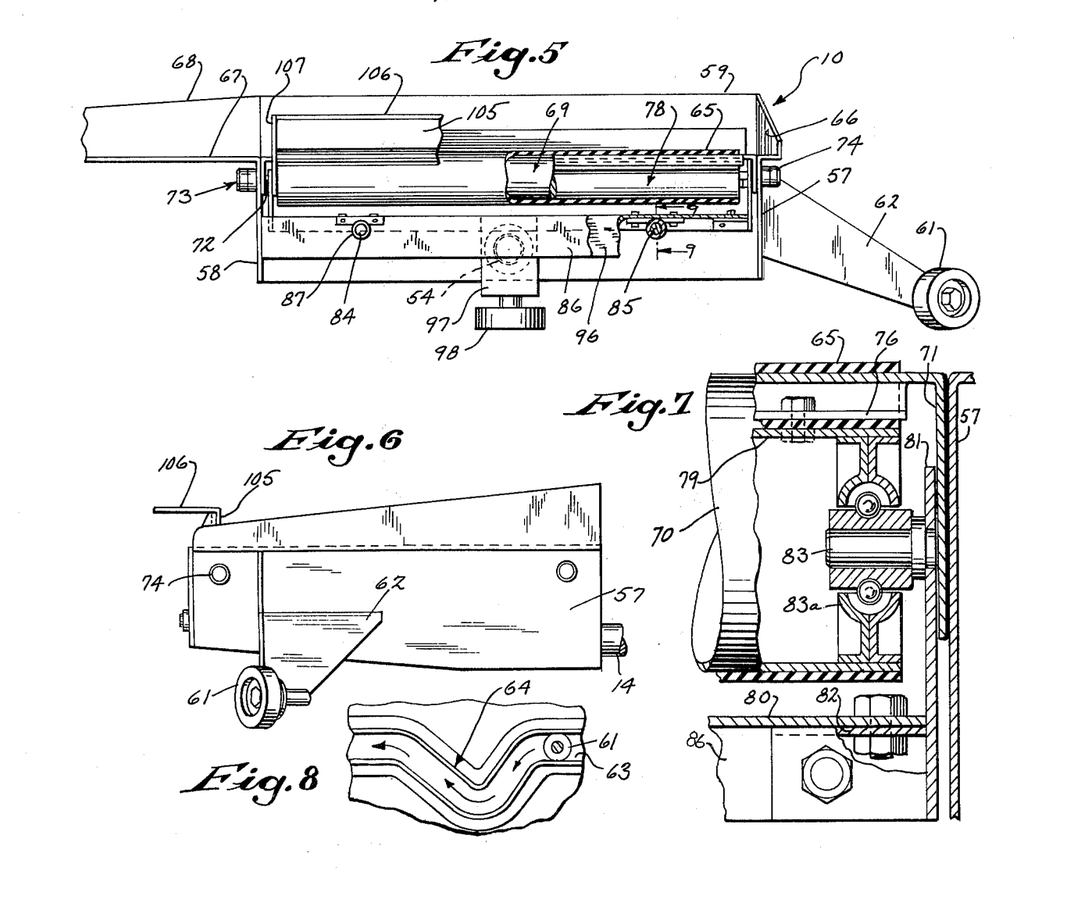
FIG. 5 is an enlarged front elevational view of the load carrying structure with parts broken away and sectioned to more clearly illustrate the construction.
FIG. 6 is a side elevational view of the load carrying structure shown in FIG. 5.
FIG. 7 is an enlarged fragmentary view taken generally on line 7—7 of FIG. 4.
FIG. 8 is a view generally on line 8—8 of FIG. 1.

Referring particularly to FIGS. 3–5, the belt extends between a main front roller 69 and a rear roller 70 with the intermediate portion supported by a horizontal fixed wall 71. The rollers 69 and 70 are similarly rotatably mounted by a shaft 72 which extends through and is secured to the outer sidewalls 57 and 58 by suitable clamping and bearing collars 73 and 74 secured to the exterior of the sidewalls as by welding or the like. The intermediate plate 71 is integrally formed with or otherwise secured to the sidewalls 57 and 58, with the upper surfaces of the plate 71, the special horizontal front and leading walls 66 and 67, and the upper edges of the rollers 69 and 70 in a common plane with the correspondingly supported belt.

The wall 71 includes L-shaped front and rear flanges 75 and 76 adjacent each of the rollers 69 and 70. The opposite ends of belt 65 are secured as by suitable nut and bolt assemblies 77 to the flanges. The belt is further elongated beneath the plate 71 and is movable with respect to the fixed rollers 69 and 70 by a pair of rollers 78 and 79 which are similarly mounted upon a bracket 80 to move simultaneously radially of the arm 14. Thus the forward end of the belt 65 is looped about the forward roller 69 and extends around the positioning roller 78, with the free end secured to the L-shaped flange 75. The opposite end of the belt 65 is similarly looped about the rear roller 70 and extends forwardly and about the positioning roller 79, with the corresponding belt end secured to the rear flange 76 of the horizontal support wall 71. Each of the rollers 78 and 79 is similarly supported on the bracket 80, as shown most clearly in FIG. 7 for rearward roller 79. The bracket 80 is a plate-like member. T-shaped brackets 81 are located to the opposite sides of bracket and each includes a horizontal mounting wall 82 projecting inwardly beneath the wall 80. The inwardly projecting walls are bolted or otherwise secured to wall 80 with brackets 81 projecting upwardly beneath the belt support wall 71. A roller shaft 83 is secured at the opposite ends in brackets 82 and rotatably affixed in the end of roller 79 by a ball bearing unit 83a.

Roller 78 is similarly mounted on bracket 80.

The movable bracket 80 spans the width of the assembly between sidewalls 57 and 58 and is supported on a pair of laterally spaced fixed shafts 84 and 85. The shafts 84 and 85 are similarly secured to a front brace 86 secured to the front end of walls 57 and 58 and the rear cross brace 60 spanning walls 57 and 58 adjacent the pivot tube 54 and the back wall 59. The shafts 84 and 85 are locked in position by similar collar members 87 secured to the shafts on the outer sides of the braces 86.

The support bracket 80 is mounted on the shafts 84 and 85 by suitable linear bearing units 88 and 89. The bearing units 88 and 89 are generally similar units, with unit 89 shown in FIG. 9 with two spaced bearings 90. The linear ball bearing unit 90 is shown including an inner bushing 91 and a plurality of supporting balls 92 extending longitudinal array and retained with the bushing by end seals 93 having a flexible wiping lip. The elongated bushings 91 are secured within opposite ends of tubular mounting members 94 is provied with fore and aft mounting cross extensions or plates 95 welded or otherwise secured thereto and attached abutting the underside of the movable bracket 80 to slidably mount the plate on the shaft. The spaced roller bearing units 90 provide a smooth continuous support which will prevent twisting of the belt structure in the assembly.

The second shaft 84 is provided with a single bearing unit 88 employing a single assembly similar to assembly 90 of FIG. 9 to provide the desired sliding support.

The bracket 80 further includes a depending forward wall 96 which is located abutting the front wall brace 86 in the forwardmost position of the bracket 80. A channel shaped bracket 97 has a wall or otherwise secured to the front wall 96 generally centrally of the unit 10 with a bottom wall located beneath the assembly.

A wheel 98 is rotatably mounted on the rearwardly extending bottom wall of the bracket 97 with a vertical axis of rotation. The wheel 98 is located below the level of the sidewalls and in alignment with operating cam assemblies 99 and 100 which are provided respectively at the loading and unloading stations, as shown in FIG. 1. Thus, the wheel 98 and each of the cam assemblies 99–100 provides a releasable coupling for positively moving of the supporting rollers 78 and 79 radially of the rotating arm 14 and constitute a means for positively moving of the belt 65 radially of the arm 14.

As shown in FIGS. 1–3, the load positioning cam assembly 99 includes a channel shaped member which is secured to the supporting framework to define a vertical cam wall 101. The leading or first engaged end 102 of the cam wall 101 is located in angularly forward spaced relation to the loading station 2 and in particular is located to engage the wheel 98 with the rollers 78–79 and tray belt 65 in a forwardmost position shown in FIG. 3. The wheel engages and rides on the vertical wall 101 such that the continued forced rotation of the arm 14 and tray assembly 10–13 positively moves the corresponding wheel 98 and the interconnected belt assembly to the radially outward maximum position when aligned with the induction conveying apparatus 2, as shown in FIGS. 1 and 2. Thus, at the loading station, the cam unit 99 causes the forward roller 78 to positively pull on the belt 65 putting a forward tension on the upper belt supporting surface. The loaded belt assembly 65 is maintained in this position, until the tray unit 10 moves into engagement with the unloading cam mechanism 100 at the unloading station and thus into alignment with sorter 4.

The unloading cam mechanism 100 is generally a similarly constructed cam wall member which moves inwardly from the leading or first engaged end 103 and is of a relatively short length to produce a relatively rapid movement of the assembly inwardly from the position established at the loading station 2. The cam wheel 98 engages the inner surface of the vertical cam wall 100 and is caused to move radially inwardly as a result of the curvature thereof. As illustrated, the discharge cam wall 100 has the initial portion 103 which smoothly engages the roller 98 with a relatively slight movement of the belt 65. The cam wall 100 then curves radially outwardly, slightly, until the tray assembly is almost in the unloading position at which time the cam wall curves circumferentially and radially inwardly at a relatively rapid rate. This results in a smooth engagement with the discharge mechanism and then establishes a very rapid movement of the belt 65 as it moves over the aligned tray unit 7 to correspondingly move the load 1 to the discharge position, with the load falling onto the appropriate tray unit 17. The final portion of the cam discharge wall 100 is bent radially outwardly again as at 104 to provide a smooth release of the belt assembly and locates the wheel 98 to provide smooth engagement with the reset cam 99 as the tray assembly 10-13 subsequently moves into the loading station 2 for receiving of a new load. This results in the inward movement of the belt rollers 78-79 with an outward movement of the upper surface of the belt 65 to provide for movement of the load 1 from the tray assembly 10 as a front stop wall or lip 105 is pivoted to the discharge position. Simultaneously, the rearward movement of the roller 79 associated with the rear end of the belt 65 permits the forward movement of the belt to prevent lock-up of the assembly. This permits the rearward movement of the rollers 78-79 and forward movement of the elt 65 with the load 1 located in the phantom line position of FIG. 1 to the back of the tray means. The tray assembly 10 also includes a rearward wall or lip 102a extending between the upper surface of the belt 65 adjacent the rear roller 70 and the back wall 59 to prevent articles from falling therebetween.

In the embodiment of FIGS. 1-9, a pivotally mounted front wall or lip 105 is shown projecting upwardly of the belt 65 and releasably closes the discharge end of the tray assembly 10 to prevent premature discharge of the load 1 at the unloading station, or throwing of the load 1 from the tray assembly as a result of centrifugal forces resulting from the rotation thereof. Generally, the lip structure has not been required.

In the llustrated embodiment of the invention, the front tray lip 105 includes a vertical wall portion integrally connected with an arcuate top wall portion 106 in overlying spaced relation to the front roller 69 and with the belt 65 passing therebetween. A pair of end pivot brackets 107 are provided on the opposite ends of the lip 105 and are affixed to the end faces of the roller 69 in any suitable manner to pivot therewith. In the raised position of FIG. 3, the wall 105 defines a vertical stop to movement of the load 1 from the tray assembly 10. As the belt member 65 is moved forwardly to discharge the load, the rotation of the roller 69 by the belt 65 results in rotation of the lip member 105 downwardly and out of the load 1 to permit discharge of the load from the tray unit 10. The lip 105 is illustrated with an upper wall 106 having an arcuate outer edge located as a continuance of the radius of the trailing auxiliary wall segment 67 of the tray unit 10. the loading or induction apparatus places the load 1 on the belt 65 inwardly of the lip 105.

The stop lip 105 is then automatically positioned in and removed from the stop position in accordance with the desired synchronized movement of the load 1 onto and from the belt 65 as a result of the driven relationship of the lip 105 transfer belt 65.

In summary the drive cam assmblies 98 and 100 provided at the adjacent loading and unloading stations respectively establish operative engagement and positioning of the rollers 78-79 and attached belt 65 as heretofore broadly described. The load 1 is introduced onto the tray assembly 10 beyond the stop lip 105. As the spider unit 16 continues to rotate, the tray assembly 10 as well as the associated other units 10-13 move along the guide rail 63. As a wheel 61 of a loaded unit 10-13 engages the valley 64 in the rail 63 and rides down the valley, the tray unit 10-13 tips about the axis of the arm 14 and relocates the load 1 on the abutting forward or leading pocketed wall 66. Wheel 61 then rides up the opposite side of the valley 64 to again position the load belt 65 in the horizontal position.

As the loaded tray unit 10-13 approaches the unloading location, the spider unit 16 has rotated the corresponding arm member 14 outwardly with respect to the crank axis resulting in a relatively long effective radius. The tray assembly 10 - 13 is then moving at a accelerated or greater velocity than during the loading, thus, the coupling units 18 in moving through corresponding angles vary the coupling position so as to vary the velocity of the arms. The velocity of the arms vary to accommodate or match the relative angular displacement resulting from the fixed angular relationship of the coupling units 18.

To unload, the cam wheel 98 moves into smooth engagement with the relatively short unloading cam 101, with the initial portion 103 providing a smooth engagement of the assembly with the wheel 98. The continued movement results in pivoting of the lip 105 to a discharge position, with a rapid forward and radially outward movement of the belt 65 to drop the load 1 onto the aligned sorter tray unit 7. The movement is very rapid not only as a result of the relatively steep arrangement of the cam surface but also because of the relatively high velocity of the arm 14 provided by the spider type construction or other similar functioning drive. Thus, under a practical construction the velocity can be readily increased by a factor of four to five times resulting in a very rapid and reliable discharge of the load.

As the arms 14 rotate, the spider construction continuously varies the velocity of the tray assembly maintaining minimum velocity at the loading station and maximum velocity at the unloading station. As shown in FIG. 1, the arms collapse toward each other adjacent the loading station or location of low velocity and the number of tray units are necessarily limited to prevent interference between adjacent trays, in the illustrated embodiment of the drive system.

Figure 10:
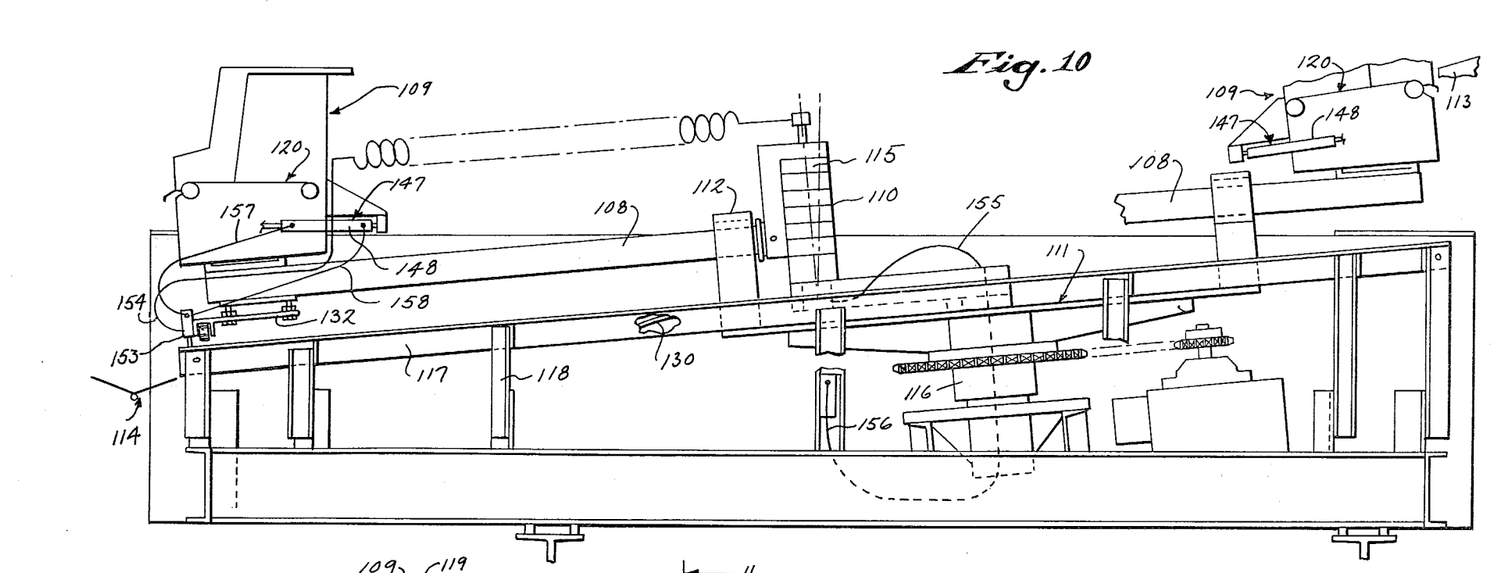
FIG. 10 is a view similar to FIG. 3 illustrating an alternative embodiment.
Figure 11:
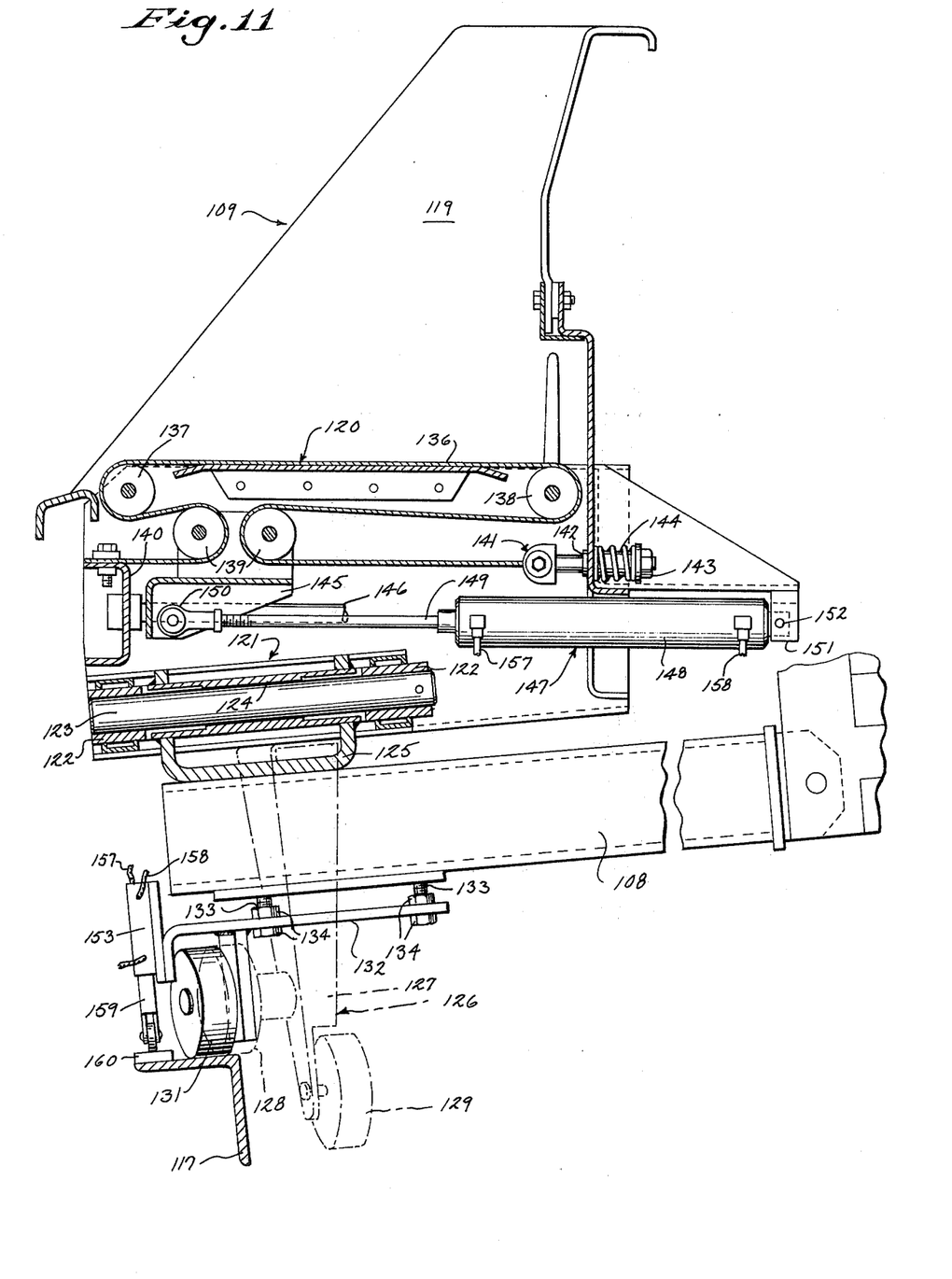
FIG. 11 is a front elevational view of a tray unit shown in FIGS. 10.
Figure 12:
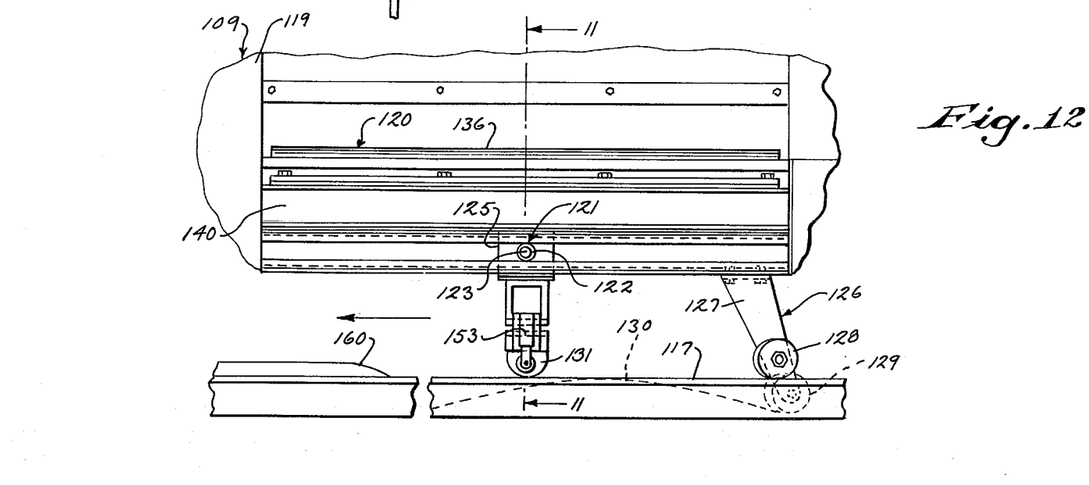
FIG. 12 is an enlarged vertical section of a tray unit shown in FIGS. 10 and 11.

A modified embodiment of the present invention is illustrated in FIGS. 10 and 11 employing a similar plurality of variable length drive arm 108. Tray units 109 are secured to the outer end of each drive arm which extends inwardly to a rotating coupler 110. A rotating spider unit 111 includes sliding collars 112 coupled to each arm 108 to impart rotary motion thereto with the effective length of the arm varying with the angular orientation of the arm between diametrically located loading and unloading stations 113 and 114 as in the previous emodiment. In this embodiment, the receiving sorter 114 is located adjacent the outer periphery of the rotating tray units 109. In the modified embodiment, the pider drive and arm axis are similarly angularly oriented as at 115 and 116, to tilt the tool assembly with respect to the horizontal and in particular to improve loading of the supporting tray units 109 at the loading station 113 by tilting of the tray units 109 as shown in FIG. 10, which may, for example, be approximately ten degrees. The particularly angular orientation of the total assembly is maintained by the corresponding support of the outer supporting track 117 which is mounted on several supporting struts 118 of appropriately varied lengths to properly angularly orient the tray units.

The tray structures or units 109 are pivotally mounted on the outer end of the several arms 108 more clearly illustrated in FIG. 10. More particularly, the tray units 109 include a load confining upper portion 119 defining rear and side walls within which a reciprocable belt assembly 120 is located.

A pivot support bracket is provided to the front, underside of the tray unit 109 beneath the belt assembly 120. The support brackets 121 includes bearing members 122 secured to a support shaft 123 which is journaled in a supporting tube 124. A generally U-shaped bracket 125 is bolted or otherwise secured to the outer end of the arm 108 and opens upwardly into the bracket 121. The support tube 124 is welded within the bracket arms to locate the tray unit 109 with the pivot axis of shaft 123 parallel to the arm 108, and with the bracket 121 extending laterally to one side of the arm 108.

The tray unit 109 is supported by a tilt wheel assembly 126 including a tray tilt arm 127 which is secured to the unerside or bottom wall of the tray and bracket 121. The tilt arm 127 depends downwardly past the arm 108 with a generally horizontally disposed wheel 128 secured to the lower portion and riding on the supporting track 117. A tilt wheel 129 is secured to the lowermost end of the wheel arm 127 within the track 117. A tilt cam plate 130 is secured to the inner wall of the track 117 following the loading station 113. Cam plate 130 is inclined to positively pivot the tray unit 109 about the pivot shaft tube 124 as the drive arm 108 rotates past the cam plate 130.

The drive arm 108 is supported on the track 116 by a wheel 131 secured to the underside of the arm 108, by a suitable mounting plate 132.

A pair of longitudinally spaced adjustable mounting bolts 133 extend downwardly from the arm 108 through the mounting plate 132 with a pair of clamping nuts 134 to the opposite side of the plate. The plate projects outwardly with a wheel 131 rotatably secured to a depending plate on the outer end portion and rotatably supporting the arm 108. The tray unit 109 and particularly belt assembly 120 is thus appropriately supported for loading at station 113, and pivoting as the arm 108 moves over cam plate 130 to relocate the load for unloading at station 114 by operations of belt assembly 120.

The belt assembly 120 includes a flexible belt 136 which is looped about a forward and a rear fixed idler rollers 137 and 138, which extend toward each other and are looped backwardly over a pair of carriage support rollers 139. The forward or leading edge of the belt 136 extends forwardly and is bolted or otherwise affixed to a front wall member 140 of the tray unit 109. The trailing end of the belt 136 extends rearwardly and is resiliently mounted by a spring loaded mounting bolt 141. The rearmost belt end is secured to the head of the bolt 141 which extends rearwardly and is journaled in a bushing 142 in the back wall of the tray unit 109. The outermost end of the bolt 141 carries an attachment washer nut 143 with a coil spring 144 encircling the bolt between the back wall bushing 142 and the washer and nut 143 to resiliently load and provide continuous tension on the supporting belt 136.

The carriage rollers 139 in the embodiment of FIGS. 10 and 11 are secured to a carriage 145 journaled on suitable longitudinally extending shafts 146 secured between the front and back walls of the structure, generally similar to that previously described. In the second embodiment of the invention, the carriage 145 is selectively positioned between the forward and back position by pneumatic operator 147 including a pneumatic cylinder 148 from which a piston rod 149 projects forwardly and is pivotally interconnected to the carriage 145 as at 150. The cylinder 148 extends rearwardly and is pivotedly interconnected to a bracket 151 on the aft end of the tray unit 109, as at 152.

A pneumatic control system includes an air valve 153 secured to the tray support arm 108 and particularly plate 132 and mechanically actuated between a load ejection position and a reset position. An air supply line 154 is coupled to one side of the air valve 153 and is suitably mounted in any desired manner extending rearwardly to the pivot support and coupler 110. The line 154 is extended therethrough to a coupling line 155 to the spider drive where it is coupled to the source line 156.

The valve 153 further includes a pair of outputs connected by coupling lines 157 and 158 to the opposite ends of the cylinder 147. In the release or reset position of the air valve 153, air pressure is supplied via line 158 to the trailing or aft end of the cylinder 147 with the forward end connected to exhaust by the air line 157. The operator is then in the expanded position of FIG. 10 with the carriage 145 in the forward or outer position. This is the normal loading and transfer position. The valve 153 is mounted on the outer end of plate 132 with a depending operator 159. At an unloading station 114, a valve operating cam 160 is secured to the track outwardly of the wheel engaged portion and extends arcuately about the loading station. As the tray unit 109 moves over the cam 160, the operator 159 rides upwardly thereon. This shifts and mechanically operates the air valve 153 to the alternate position reversing the connection of the input line 154 to the coupling lines 157 and 158 and thus reverses the air pressure to the cylinder 148. The reverse pressures, of course, cause retraction of the pistons and attached piston rod 149 to cause the carriage 145 to move rearwardly. The connected belt 136 moves to discharge the load. The illustrated cam 160 is generally an arcuate bar member secured to the track 117 outwardly of the wheel engaged portion and in alignment with the operator 159, the cam 160 is formed with a short inclined entrance portion adjacent to leading end of the cam, a constant height hold area which extends about the unloading area and terminates at the opposite end with a discharge ramp. Thus, in a practical construction, the total length may be in the order of 45° to 60° depending upon the particular application.

After the load has been discharged, the operator 159 rides off the cam 160 and resets the valve 153. The air pressure to cylinder 148 reverts to the original connection to return the carriage 145 and belt 136 to the full line position of FIG. 10.

The second embodiment therefore essentially functions in the same basic manner as the first embodiment with the inclined mounting facilitating loading and unloading and with the pneumatic belt positioning providing a reliable and quiet operation of the unloading and resetting belt assembly.

In the present invention, the speed of the tray unit or other load structure is dependent in part upon the effective length of the arm and/or offset distance between the axis of the spider and the load arm coupler. Within the broadest aspects of the present invention, the fixed mounting of the coupler from the spider drive may be eliminated with radial as well as vertical guidance of the tray units provided at the outer supporting track structure. The coupler axis would then float, and the actual offset therebetween controlled by proper design of the outer guide means. This would permit varying of the offset and the multiplication factor.

The combined accurate location of the load by laterally tilting of each tray assembly and the rapid discharge provided by the combination of the high circumferential velocity and the rapid radial movement provided by the separate belt-type structure or the like has been found to provide a highly improved and very reliable loader for a high speed sorter and the like.

Although described in a preferred construction, any other transfer means for removing the load can be provided within the broadest aspects of the present invention. For example, an auxiliary sweeping type element might be provided. Further, the tray structure might be provided to tilt along an axis normal to the radius of the arm to provide for a corresponding sliding discharge. Similarly, the spider arrangement can be modified to provide any other type desired mechanical drive system in order to vary the effective length of the arm. For example, a cam structure can be provided on the outer pivot end of the arm or any other intermediate location with suitable coupling to the tray supporting arm to maintain its radius effectively varied. The illustrated spider construction with its interconnecting mechanical drive systems has been found to provide a highly practical and reliable method of maintaining the desired drive system.

The present invention thus provides a highly improved transfer apparatus where the receipt and removal of a load is to be made at significantly different velocity.

Various modes of carrying out the invention are contemplated as being within the scope of the following claims, particularly pointing out and distinctly claiming the subject matter which is regarded as the invention.

We claim:

1. In rotary transfer apparatus having at least one arm member having a rotating pivot support and mounted for rotation about a first axis, a load supporting unit secured to the arm member, a rotating drive means having a second axis parallel with and spaced from the first axis, coupling means connected to said drive means and movably connected to said arm member and moving along said arm member as the arm member rotates to continuously vary the drive connection along the length of the arm member and thereby continuously control of the velocity of the load supporting structure while moving the load supporting structure in a predetermined circular path.

2. The transfer apparatus of claim 1 wherein each of said load supporting units includes an unloading means for rapidly radially discharging of a load from the load supporting unit, and means coupled to the drive means for selectively positioning of said unloading means to automatically move a load at a preselected location.

3. The transfer apparatus of claim 2 including means to pivot said load supporting unit above an axis radial of said first axis.

4. The apparatus of claim 1 wherein said supporting units includes a load carrier reciprocably mounted for radial movement with respect to the path of rotation, a cam drive means including a cam member and a separate follower releasably engaging said cam member, means securing one of said members to said carrier and the other of said members being mounted in fixed relation adjacent the unloading station, reset means positioning said member of the cam means on the carrier for engagement with the member at the unloading station to effect a rapid movement of the carrier toward the outer periphery of the tray assembly to rapidly radially transfer the load.

5. The transfer apparatus of claim 1 wherein the supporting units includes a load carrier reciprocably mounted for radial movement with respect to the path of rotation, a pneumatic motor mounted on the unloading means and connected to move the load carrier, and means at a selected angular orientation of the unloading means to actuate the pneumatic motor to reciprocate the load carrier to transfer the load and reset the load carrier.

6. The transfer apparatus of claim 1 said load supporting unit includes a belt member mounted for reciprocating movement radially of the rotating arm, said belt structure being looped about an outer and an inner supporting fixed roller means, a belt positioning assembly including a pair of closely spaced roller means located intermediate the fixed rollers, the opposite ends of said belts being looped about the adjacent positioning roller and having the opposite end thereof mounted in fixed relation to the tray assembly, and actuating means for simultaneous positioning of said pair of rollers between said pair of fixed rollers to thereby automatically provide for a corresponding pulling on one end of the roller while relieving the opposite end of the belt to move over the opposite fixed roller.

7. The transfer apparatus of claim 6 wherein said actuating means includes a pneumatic operator includes a piston means secured to said pair of rollers and a cylinder means connected to the load supporting unit to move the associated pair of rollers radially of the arm member and a cam member located adjacent the path of said arm member, and a fluid valve means connected to the arm member and having an operator engaging the cam member to activate the cylinder to correspondingly position the associate pair of rollers radially outwardly and to reset the rollers after disengaging the cam member.

8. The rotating transfer apparatus of claim 1 including a loading means overlying the path of the rotating supporting unit for transfer of a load thereto, and a conveying means passes beneath the path of the supporting unit in spaced relation to said loading means for receiving a load, and means for moving of the supporting unit radially of the arm member for transfer of the load therefrom.

9. The rotating transfer apparatus of claim 1 including means for transfer of a load radially of the supporting unit, and an outer stop wall in the path of the load and selectively movable from the path of the load.

10. The rotating transfer apparatus of claim 1 wherein the support unit includes a belt member mounted for reciprocating movement radially of the rotating arm and over a roller located at the discharge end of the belt member, a stop wall secured to said roller and selectively positioned to prevent and allow movement from said belt member 11. A rotating unloading apparatus of claim 1, wherein said rotating drive means includes a spider member rotatably mounted about said second axis, a crank member secured to said pivot support and projecting outwardly therefrom and terminating in said rotating pivot support, said coupling means including a sliding drive means connected between said spider member and said arm member permitting relative sliding movement along the radius of the arm member, and means coupled to said spider to drive said spider at a predetermined constant velocity.

12. The apparatus of claim 11 wherein said arm member includes a shaft having bearing means on said pivot support, said load supporting unit being pivotally mounted on said shaft for rotation about said axis.

13. The apparatus of claim 12 having four of the load arm members, each of which includes a corresponding load support unit, said spider member including a plate rotatably mounted and having four equicircumferentially located trunnion units sliding upon the shaft of each arm member for said movement along the arm member, and means coupled to said plate to drive said plate at a predetermined constant velocity.

14. The apparatus of claim 13 including a loading means adjacent the path of the rotating supporting units for sequential transfer of a load thereto, and a conveying means passing adjacent the path of the supporting units in spaced relation to said loading means for receiving of a load, and means for moving of the supporting units radially of the arm member for transfer of the load therefrom.

15. The unloading apparatus of claim 1 wherein each load supporting unit includes a tray assembly having a pair of sidewalls, a pivot support member secured between said sidewalls and rotatably mounted on the arm member with axis generally parallel to the arm member, a horizontal supporting track means located in accordance with the path of the travel of the tray assemblies, each of said tray assemblies including a guide means connected to the tray assembly and to the supporting track means, said track means having a cam portion engaged by the guide means and causing the tray assembly to pivot about said arm and thereby moving a load thereon into engagement with the leading sidewall.

16. The apparatus of claim 15, wherein tray assembly includes a reciprocating member position roller means said guide means includes a depending wheel secured to said positioning roller means, a first cam member secured at a loading position and including a vertical cam wall having a leading portion located circumferentially to engage the wheel and moving outwardly to positively move the wheel and associated positioning roller means radially outwardly and a second cam member at an unloading location and having and initial portion engaged by the wheel and moving circumferentially and radially inwardly to positively move the wheel of associated positioning roller means radially inwardly.

17. The apparatus of claim 15 wherein each of said tray assemblies includes a belt member mounted for reciprocating movement radially of the rotating arm, said belt structure being looped about an outer and an inner supporting fixed roller means on the tray assembly, a belt positioning assembly including a pair of closely spaced positioning roller means and having the opposite end thereof mounted in fixed relation to the tray assembly and means for the simultaneous positioning of said pair of positioning roller means between said pair of fixed roller means.

18. The transfer apparatus of claim 17 wherein each of said belt positioning assemblies includes a bracket means, a pair of shaft means radially extended to the underside of the tray assembly, linear bearing means secured to said bracket means and journaled on said shaft means, and means coupled to the bracket means for selectively positioning of said bracket means and positioning roller means to automatically move the belt and load thereon.

19. The apparatus of claim 17 wherein each of the tray assemblies includes a horizontal segmental shaped trailing horizontal wall generally in the transport plane of the belt.

20. The apparatus of claim 17 wherein each of said tray assemblies includes a leading wall defining a pocket construction tapering outwardly of the tray assembly.

21. The apparatus of claim 1 wherein a plurality of said supporting units are provided, each of said supporting units including a framework defining a back wall and a pair of sidewalls, a pivot support member secured centrally between said sidewalls, a plurality of pivot arms rotatably mounted on a fixed axis and projecting radially outwardly therefrom, each of said units having a corresponding pivot support mounted on the end of a corresponding one of the pivot arms, a generally horizontal track wall located in accordance with the path of the travel of the units, each of said units including a supporting wheel means connected to the framework and resting on the track wall, said track wall having a cam portion engageable by said wheel means and causing the unit to pivot about said arm and thereby moving a load thereon into engagement with the leading side wall, each of said units including a belt member mounted for reciprocating movement radially of the rotating arm, said belt structure being looped about an outer and an inner supporting fixed roller on the tray assembly, a belt positioning assembly including a pair of closely spaced positioning rollers located intermediate said fixed followers, the opposite ends of said belts being looped about the adjacent positioning roller and having the opposite end thereof mounted in relatively fixed relation to the tray assembly, and positioning means for simultaneous positioning of said pair of positioning rollers between said pair of fixed rollers to thereby automatically provide for a corresponding pulling on one end of the roller while relieving the opposite end of the belt to move over the opposite fixed roller.

22. The transfer apparatus of claim 21 wherein said positioning means is a fluid operator means coupled to the unloading means for selectively positioning of said unloading means, a valve means is connected to reversibly drive said fluid operator, and activating means mounted in the path of the rotating arm and units to selectively activate said valve means.

23. The transfer apparatus of claim 22 wherein each of said fluid operators is a piston-cylinder unit connected to the unloading means and to the supporting unit, said activating means includes a cam means, and having a valve means connected to the supporting structure and having an operator engageable with the cam means for selectively positioning of said unloading means.

24. The apparatus of claim 21 wherein said positioning means includes a positioning bracket secured to said pair of positioning rollers, a depending wheel secured to said positioning bracket, a loading cam member secured at a loading position and including a vertical cam wall having a leading portion located circumferentially to engage the wheel and moving outwardly to positively move the wheel and associated positioning rollers radially outwardly, an unloading cam member spaced from said loading cam member having an initial portion engaged by the wheel and moving circumferentially and radially inwardly.

25. The transfer apparatus of claim 21 wherein said track is angularly oriented from a horizontal plane and said arms rotate in a corresponding plane.

26. The transfer apparatus of claim 25 wherein said units are mounted to each arm to locate the belts in a generally horizontal plane.

27. The rotating transfer apparatus of claim 25 including a loading means overlying the path of the rotating supporting units for a transfer of a load thereto, and a conveying means passing beneath the path of the supporting units in spaced relation to said loading means for receiving of load.

28. A rotary transfer apparatus, comprising at least one support means including a member rotatably mounted on a first drive axis for rotation in a given plane about a pivot support and having a load supporting structure carried by said member, drive and coupling means movably associated with said member and having a second drive axis spaced from said first pivot support, said drive and coupling means moving along the member with the rotation of the member to vary the effective driving velocity of the member to thereby change the velocity of the load supporting structure while moving of the load supporting structure on a predetermined path, and mount means to mount the drive and coupling means with said first and second drive axis of rotation normal to said given plane and axii being angularly oriented to a vertical position to tilt said plane relative to the horizontal.

29. The rotary transfer apparatus of claim 28 including means to locate the load supporting structure with a planar support member angularly oriented with respect to said plane.

30. The transfer apparatus of claim 28 wherein each of said load supporting structure includes a belt member mounted for reciprocating movement radially of the rotating member, said belt member being looped about an outer and an inner supporting fixed roller means, a belt positioning assembly including a pair of closely spaced roller means located intermediate said fixed rollers, the opposite ends of said belts being looped about the adjacent positioning roller and having the opposite end thereof mounted in fixed relation to the tray assembly, and actuating means for simultaneous positioning of said pair of rollers between said pair of fixed rollers to thereby automatically provide for a corresponding pulling on one end of the roller while relieving the opposite end of the belt to move over the opposite fixed roller.

31. The transfer apparatus of claim 30 wherein said actuating means includes a pneumatic operator having an output secured to said pair of rollers, and a valve means to selectively supply air to said operator to selectively move the rollers radially outwardly and radially inwardly to correspondingly position the belt for loading and unloading.

32. The apparatus of claim 28 wherein each load supporting structure is pivotally mounted on the rotating member, a horizontal supporting track means located in accordance with the path of the travel of the supporting units, each of said supporting units including a guide means having a first wheel means resting on the track means and a second offset wheel means said track means having a cam wall in the path of said offset wheel to pivot the load supporting unit about said arm and thereby moving a load thereon into engagement with the leading sidewall.

* * * * *